United States Patent
Caballero et al.

(10) Patent No.: US 7,488,511 B2
(45) Date of Patent: *Feb. 10, 2009

(54) METHOD OF MANUFACTURING TETRAFLUORETHYLENE PERFLUOROMETHYL VINYL ETHER COPOLYMER COATED GLASS

(75) Inventors: Adino D. Caballero, Hanover Park, IL (US); George F. Osterhout, Park Ridge, IL (US)

(73) Assignee: Orion Industries, Ltd., Chicago, IL (US)

( * ) Notice: Subject to any disclaimer, the term of this patent is extended or adjusted under 35 U.S.C. 154(b) by 823 days.

This patent is subject to a terminal disclaimer.

(21) Appl. No.: 11/107,234

(22) Filed: Apr. 15, 2005

(65) Prior Publication Data

US 2005/0227012 A1 Oct. 13, 2005

Related U.S. Application Data

(63) Continuation-in-part of application No. 10/186,368, filed on Jun. 27, 2002, now Pat. No. 6,884,459.

(51) Int. Cl.
*B05D 5/06* (2006.01)
(52) U.S. Cl. .............. 427/165; 427/166; 427/255.7; 427/372.2
(58) Field of Classification Search ............... 427/165, 427/166, 255.7, 372.2
See application file for complete search history.

(56) References Cited

U.S. PATENT DOCUMENTS

| | | | |
|---|---|---|---|
| 4,391,779 A | 7/1983 | Miskinis | |
| 4,462,883 A | 7/1984 | Hart | |
| 4,735,861 A | 4/1988 | Carlson | |
| 4,900,634 A | 2/1990 | Terneu et al. | |
| 5,216,536 A | 6/1993 | Agrawai et al. | |
| 5,243,251 A | 9/1993 | Inukai et al. | |
| 5,686,178 A * | 11/1997 | Stevens et al. | 428/336 |
| 5,757,564 A * | 5/1998 | Cross et al. | 359/870 |
| 5,908,704 A | 6/1999 | Friedman et al. | |
| 5,936,009 A * | 8/1999 | Harrison et al. | 523/215 |
| 6,136,161 A | 10/2000 | Yu et al. | |
| 6,171,646 B1 | 1/2001 | Gerhardinger | |
| 6,329,019 B1 | 12/2001 | Buschmeier et al. | |

(Continued)

OTHER PUBLICATIONS

Du Pont Teflon®/Tefzel® website written by www.dupont.com/teflon/chemical printed May 16, 2002.

(Continued)

*Primary Examiner*—Bret Chen
(74) *Attorney, Agent, or Firm*—Bell, Boyd & Lloyd LLP (57) ABSTRACT

A method for coating glass, and specifically for manufacturing perfluoroalkoxy copolymer coated glass and tetrafluoroethylene perfluoromethyl vinyl ether copolymer coated glass. The method includes placing a glass substrate on an electrically grounded support and cleaning it with a solvent to remove impurities and prepare the surface of the substrate to be coated. The method also includes coating the surface with a primer and uniformly applying an electro-conductive enhance to the primer so that the surface of the glass substrate is wet, but not uneven. The method includes powder spraying periluoroalkoxy copolymer or tetrafluoroethylene perfluoromethyl vinyl ether copolymer on the electro-conductive enhancer while the enhancer is still wet. The method also includes securing the perfluoromethyl vinyl ether copolymer to the glass substrate by evaporating the electro-conductive enhance.

81 Claims, 3 Drawing Sheets

U.S. PATENT DOCUMENTS

| | | | |
|---|---|---|---|
| 6,455,140 B1 * | 9/2002 | Whitney et al. | 428/212 |
| 6,593,089 B2 * | 7/2003 | Patil et al. | 435/6 |
| 6,726,979 B2 | 4/2004 | Friedman et al. | |
| 6,884,459 B2 * | 4/2005 | Caballero et al. | 427/165 |
| 6,916,542 B2 * | 7/2005 | Buhay et al. | 428/432 |
| 2001/0002291 A1 | 5/2001 | Buschmeier et al. | |

OTHER PUBLICATIONS

Du Pont Teflon®/Tefzel® website written by www.dupont.com/teflon/chemical/pfa.html printed May 13, 2002.

Duravin Seb-Evh Technical Data Sheet, written by Thermolclad, publication date unknown.

Glas-Lok GLS Technical Data Sheet, written by Innotek Powder Coatings, publication date unknown.

Hyflon MFA and PFA Design Guide, written by Solvay Solexis, published Oct. 12, 2004.

Hyflon PFA and MFA Article, printed from www.solvaysolexis.com on Oct. 1, 2004.

Norton MFA Fluoropolymer Film Article, written by Saint-Gobain Performance Plastics, published in 2002.

PE Description, printed from www.bibby-sterilin.co.uk on Feb. 15, 2004.

PFA Descriptions, printed from www.bibby-sterilin.co.uk on Nov. 17, 2004.

PMVE Article, printed from www.dupont.com on Nov. 16, 2004.

Polyethylene Description, printed from www.psrc.usm.edu/macro/pe.htm on Feb. 4, 2005.

Powder Coating of Glass and Similar Substrates Article written by David Bannick published in Jul. 2002.

Teflon Industrial Coatings Article written by Du Pont published date unknown.

Teflon® coatings for Incandescent Light Bulbs Article written by Du Pont published Jun. 1997.

* cited by examiner

METHOD OF MANUFACTURING TETRAFLUORETHYLENE PERFLUOROMETHYL VINYL ETHER COPOLYMER COATED GLASS

PRIORITY CLAIM

This application is a continuation-in-part of and claims the benefit of U.S. patent application Ser. No. 10/186,368, filed Jun. 27, 2002 now U.S. Pat. No. 6,884,459, the entire contents of which are incorporated herein.

BACKGROUND OF THE INVENTION

The present invention relates in general to coated glass, and specifically to perfluoroalkoxy copolymer coated glass, tetrafluoroethylene perfluoromethyl vinyl ether copolymer coated glass, a method of manufacturing perfluoroalkoxy copolymer coated glass and a method of manufacturing tetrafluoroethylene perfluoromethyl vinyl ether copolymer coated glass.

Coatings have been applied to glass to change one or more characteristics of the glass. One such coating is perfluoroalkoxy copolymer ("PFA") which is one of the compounds sold by E.I. Du Pont de Nemours and Company under the trademark Teflon®. PFA is most commonly used as a non-stick coating on cookware such as pots and pans. PFA has also been used to coat glass such as automobile windshields and light bulbs.

The structure of PFA makes it highly resistive to sticking or adhering to other substances. In particular, the structure of perfluoroalkoxy copolymer is a copolymer of tetrafluoroethylene ($CF_2=CF_2$) with a perfluoroalkoxy vinyl ether [$F(CF_2)mCF_2OCF—CF_2$]. The resultant polymer contains the carbon-fluorine backbone chain typical of polytetrafluoroethylene with perfluoroalkoxy side chains. The side chains are connected to the carbon-fluorine backbone of the polymer through flexible oxygen linkages. The fluorine atoms in the chain resist almost any other atom or molecule, even other fluorine atoms. As a result, the fluorine atoms in PFA resist adhering to or even being near other molecules. Thus, molecules at the surface of PFA repel the other molecules and almost anything else that attempts to adhere or come close to the PFA molecule. Additionally, the bond between the carbon and fluorine atoms is extremely strong. The bond is so stable that little to almost nothing will react with it. Thus, PFA is a desirable coating to coat glass products because it is a material, which minimally reacts with other compounds. PFA also includes very strong bonds between its atoms which enables the coating to withstand extreme temperature and pressure conditions.

Another such coating is tetrafluoroethylene perfluoromethyl vinyl ether copolymer (MFA). MFA, sold by Solvay Solexis under the trademark Hyflon® is a copolymer of tetrafluoroethylene ($CF_2=CF_2$) with a perfluoromethyl vinyl ether [$CF_2=CF—OCF_3$]. The chemical composition of MFA provides increased resistance to chemicals, good permeation characteristics and very high stress cracking resistance. Similar to PFA, MFA is highly resistive to sticking or adhering to other substances. Additionally, MFA's increased optical translucency or transparency and reduced haze make it particularly suitable for coating of light bulbs. Thus, MFA is a desirable coating to coat glass products because it is a material, which minimally reacts with other compounds. MFA also includes very strong bonds between its atoms which enables the coating to withstand extreme temperature and pressure conditions.

Another such coating is polyethylene polymer (PE). The chemical composition of PE is a chain of carbon atoms with two hydrogen attached to each carbon atom ($[CH_2=CH_2]_n$). Additionally, in branched or low-density polyethylene, one or more of the carbon atoms, instead of having hydrogens attached to them, will have another chain of PE attached to them. The chemical composition of PE provides for increased resistance to chemicals, good permeation and very high stress cracking resistance characteristics. PE is a low cost coating that is impact, abrasion and chemical resistant. PE is translucent to opaque, very flexible and non-reactive at temperatures from $-50°$ C. to $80°$ C. Thus, PE is a desirable coating to coat glass products because it is a material, which minimally reacts with other compounds.

However, there are certain problems with known PFA, MFA or PE coated glass. One known problem is that although the PFA, MFA or PE coats the glass, it does not form a strong bond with or strongly adhere to the glass because of its highly resistive nature with respect to other molecules. Thus, when a glass substrate or glass product coated with PFA, MFA or PE shatters or breaks, certain of the glass shards or pieces break away from the PFA, MFA or PE coating. In some coated glass products such as coated light bulbs, the PFA, MFA or PE coating is applied to the outside of the light bulb. When the light bulb coated with PFA, MFA or PE breaks, the glass pieces remain inside the light bulb because the PFA, MFA or PE layer creates a closed container such that the glass pieces are contained inside the light bulb. However, other glass products such as laboratory beakers are open glass containers. Therefore, the glass shards in these products can become loose and break away from the surfaces of these products. The glass shards are unsafe and may cause injury or severe injuries to users of these glass products.

Accordingly, there is a need for glass-coated materials and glass products that are coated with a material that has a very high bond strength and which strongly adheres to glass. Additionally, there is a need for a glass-coated materials and products that maintain the structural integrity of the surfaces of the glass materials and products.

SUMMARY OF THE INVENTION

The present invention relates in general to coated glass, and specifically to perfluoroalkoxy copolymer coated glass and a method of manufacturing perfluoroalkoxy copolymer coated glass.

One embodiment of the perfluoroalkoxy copolymer or PFA coated glass of the present invention includes a glass substrate, which may be any suitable glass substrate, a layer of primer applied to the surface of the glass substrate being coated, an electro-conductive enhancer applied to the primer and a layer of PFA applied to the electro-conductive enhancer to form the coated glass substrate, wherein the electro-conductive enhancer is evaporated to secure the PFA to the surface of the glass substrate.

In another embodiment of the present invention, the tetrafluoroethylene perfluoromethyl vinyl ether copolymer or MFA coated glass includes a glass substrate, which may be any suitable glass substrate, a layer of primer applied to the surface of the glass substrate being coated, an electro-conductive enhancer applied to the primer and a layer of MFA applied to the electro-conductive enhancer to form the coated glass substrate, wherein the electro-conductive enhancer is evaporated or removed by evaporation to secure the MFA to the surface of the glass substrate.

In another embodiment of the present invention, the polyethylene copolymer or PE coated glass includes a glass substrate, which may be any suitable glass substrate, a layer of primer applied to the surface of the glass substrate being coated, an electro-conductive enhancer applied to the primer and a layer of PE applied to the electro-conductive enhancer to form the coated glass substrate, wherein the electro-conductive enhancer is evaporated or removed by evaporation to secure the PE to the surface of the glass substrate.

In one presently preferred embodiment of the method of the present invention, a glass substrate is positioned on an electrically conductive support. The surface of the glass substrate being coated is cleaned with a cleaner such as a solvent. In one embodiment, the solvent is methyl ethyl ketone ("MEK"). This solvent cleans and removes impurities which may be present on the surface of the glass substrate. In this step, the solvent may be manually applied or mechanically applied to the glass substrate as desired by the manufacturer. Alternatively, the substrate may be pre-cleaned and the coating method may be performed in a suitable "clean room" where the cleaning step is not necessary.

In the next step, a layer of primer is applied to the surface of the substrate. The primer is applied as a mist or atomized spray so that a cloudy or opaque appearance does not form on the surface of the glass substrate. After the primer is applied, the primer is cured using a suitable curing process. The curing process dries the primer and strengthens the bonds between the primer and the surface of the glass substrate. In a presently preferred embodiment, the primer is cured at a temperature of approximately 500° F. (260° C.) for approximately five minutes. It should be appreciated that other suitable curing processes may be employed in accordance with the present invention.

When the primer has been properly cured, an electro-conductive enhancer is applied on the primer on the surface of the glass substrate. In the presently preferred embodiment, the enhancer is a highly polar solvent which is electrically conductive. When the solvent is applied, the glass substrate becomes electrically grounded. By grounding the glass substrate, the solvent becomes charged and thereby attracts oppositely charged particles. In one presently preferred embodiment, the solvent is a water soluble solvent such as N-methyl-2-pyrrolidone (NMP). In a presently preferred embodiment, the NMP layer is sprayed or applied to the surface as a fog or mist so as to completely wet the surface of the glass substrate. However, the NMP layer is preferably applied so as to avoid forming a thick layer and avoid drippings which might detract from the bonding ability of the coatings.

While the solvent or NMP layer is still wet, a layer of PFA, MFA or PE in powder form is sprayed over the wet NMP. The PFA, MFA or PE particles have a charge which is opposite to the charge of the NMP. Thus, the PFA, MFA or PE particles are attracted to the NMP on the surface of the glass substrate. As a result, the PFA, MFA or PE particles uniformly coat the surface of the NMP on the glass substrate. The PFA, MFA or PE is applied to the NMP until the coatings on the surface of the glass substrate achieve a desired thickness. In one presently preferred embodiment, the desired thickness is approximately 0.002 and 0.003 inches. Other suitable thickness ranges may be used as desired by the manufacturer for other types of glass substrates or glass products.

Once the PFA, MFA or PE layer is applied to the surface of the glass substrate, the NMP and PFA, MFA or PE layers are heated, to evaporate the solvent or NMP from the surface of the glass substrate and cure the PFA, MFA or PE. In one embodiment, the NMP and PFA or MFA layers are heated to a temperature of approximately 800° F. (427° C.) for approximately twenty minutes. In another embodiment, the NMP and PE layers are heated to a temperature of approximately 400° F. (204° C.) for approximately five to ten minutes depending on the mass of the glass. The heating process evaporates the NMP and cures the PFA, MFA or PE layer which directly adheres to the primer on the surface of the glass substrate. Because the PFA, MFA or PE was applied to the wet solvent, the PFA, MFA or PE is tightly packed and forms a uniform coating on the surface of the glass substrate. As a result, the coated glass substrate is clearer or more transparent and translucent. It should be appreciated that any suitable fluoropolymer, such as other polytetrafluoroethylene copolymers may be employed in accordance with the present invention. It should be further appreciated that any suitable non-fluoropolymer, such as any vinyl or transparent powders may be employed in accordance with the present invention.

It should be appreciated that the method of manufacturing or forming the PFA, MFA or PE coated glass may be performed as described above by applying or spraying the coatings on to the surface of a glass substrate or glass product. Alternatively, the coatings may be applied using other suitable coating methods. In one embodiment, the NMP layer is applied by dipping the glass substrate in the NMP solvent. This coating process ensures that the surface of the glass substrate is completely coated with the solvent.

It is therefore an advantage of the present invention to provide PFA, MFA or PE coated glass and a method for manufacturing the PFA, MFA or PE coated glass that maintains the structural integrity of the glass.

Another advantage of the present invention is to provide a method for manufacturing coated glass which enables a perfluoroalkoxy copolymer coating or a non-fluoropolymer coating to adhere to a glass substrate.

Another advantage of the present invention is to provide a method for manufacturing coated glass which enables a tetrafluoroethylene perfluoromethyl vinyl ether copolymer coating to adhere to a glass substrate.

A further advantage of the present invention is to provide a method of manufacturing coated glass that forms a strong bond between a perfluoroalkoxy copolymer and a glass substrate.

Another advantage of the present invention is to provide a coated glass substrate and a method of manufacturing same that can be used on a wide variety of glass substrates and products.

Additional features and advantages of the present invention are described in and will be apparent from, the following Detailed Description of the Invention and the Figures.

DETAILED DESCRIPTION OF THE INVENTION

Referring now to FIGS. 1A, 1B, 2, 3A and 3B, one embodiment of the coated glass product or substrate of the present invention is illustrated. The coated glass substrate or glass product 100 includes a glass substrate 102, a layer of primer 104 applied to at least one portion, area or surface of the glass substrate and a layer of PFA, MFA or PE 108 applied to the primer layer on the surface of the glass substrate 102. This combination creates a very strong bond between the PFA, MFA or PE and the primer on the surface of the glass substrate and thereby enables the PFA, MFA or PE layer to adhere to and stretch with the glass substrate, which substantially holds the glass substrate in tact. Additionally, the strong bond formed between the PFA or MFA and the glass substrate enables the coated glass substrate to withstand extreme conditions such as extreme temperatures and pressures. It should be appreciated that the glass substrate 102 may be any suitable type of glass substrate. Additionally, the glass substrate 102 may also be any suitable shape or configuration.

Figure 1A:
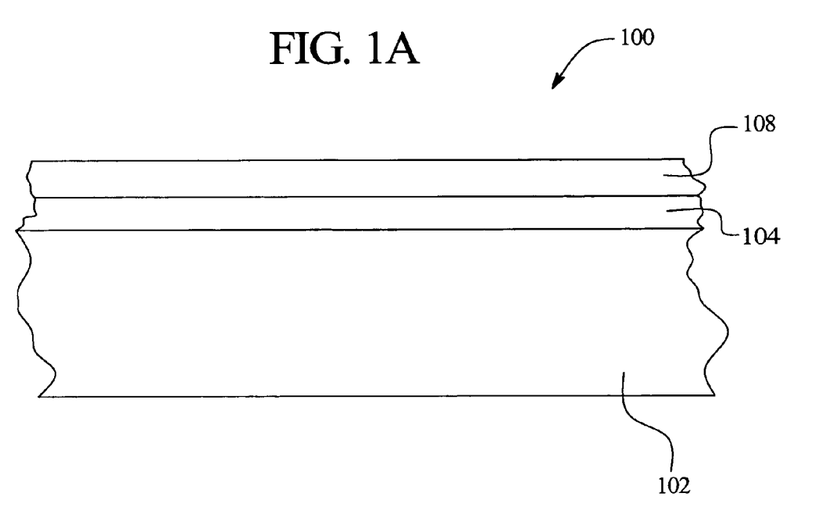
FIG. 1A is an enlarged fragmentary side view of a coated glass substrate of one embodiment of the present invention.
Figure 1B:
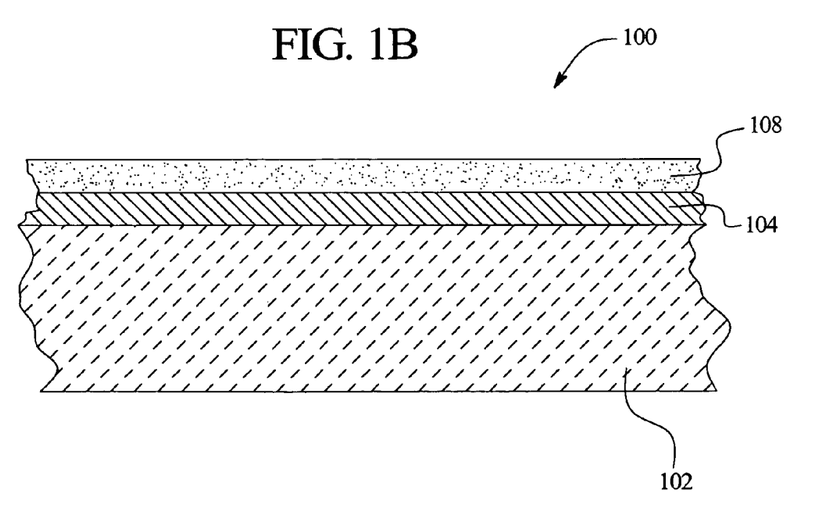
FIG. 1B is an enlarged fragmentary cross-sectional view of the coated glass substrate of FIG. 1A.
Figure 2:
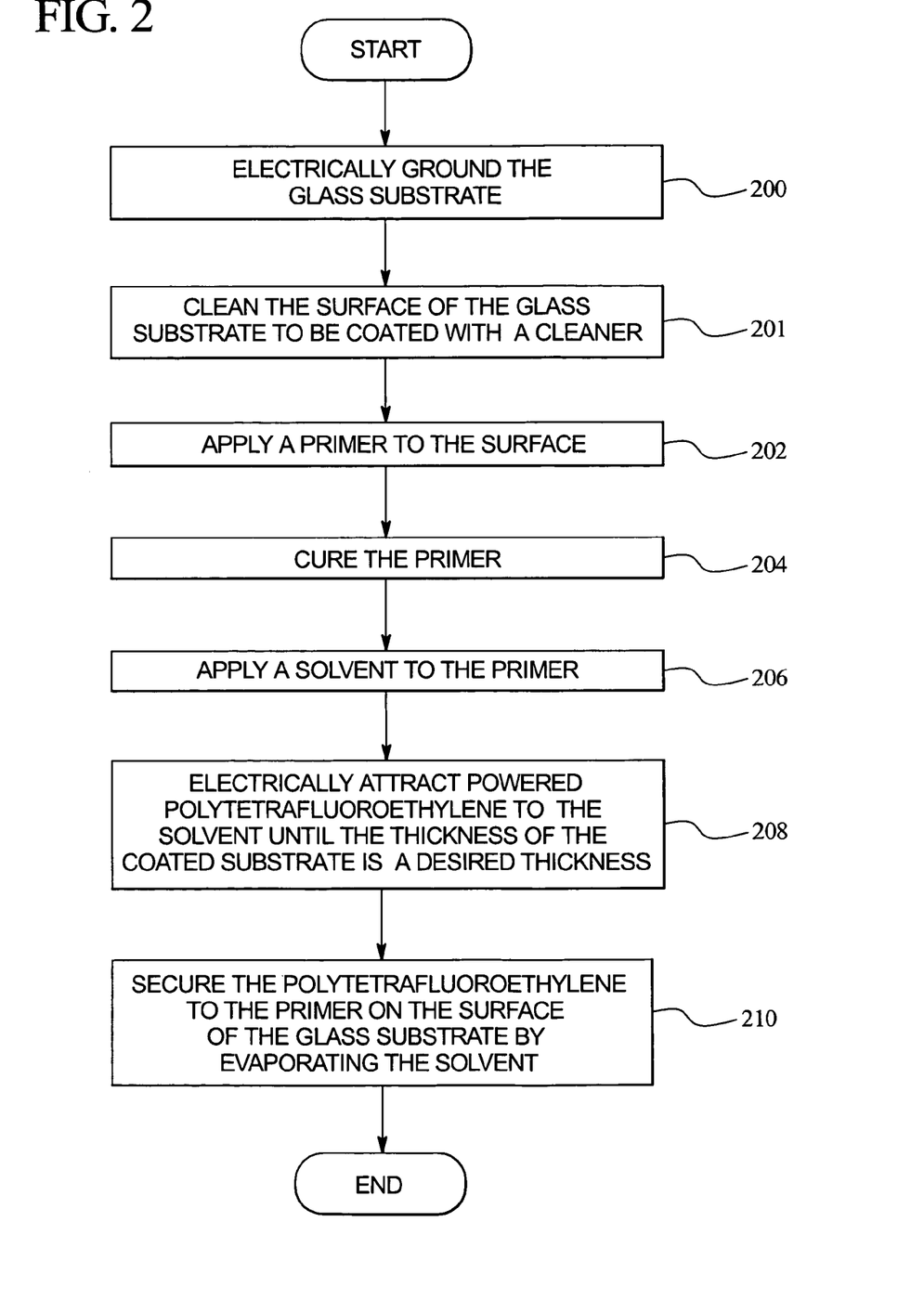
FIG. 2 is a flowchart illustrating one embodiment of the coating method of the present invention.
Figure 3A:
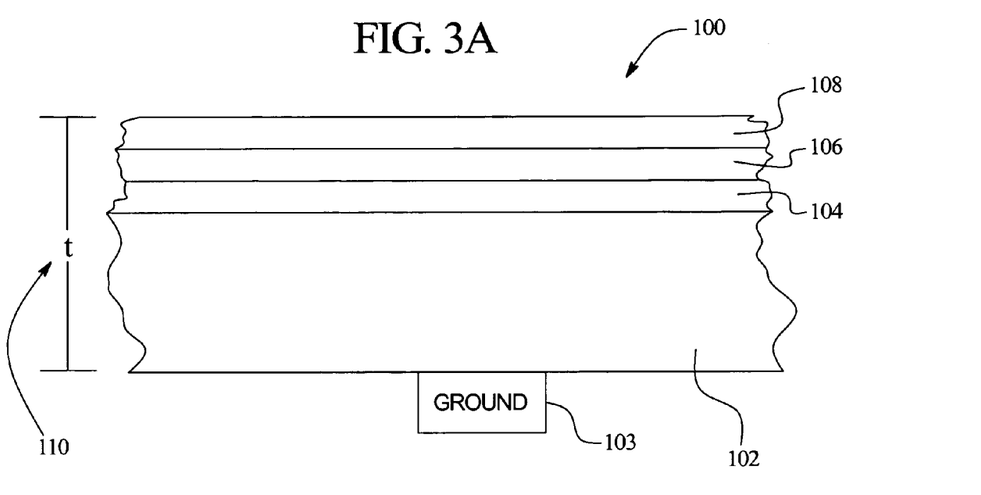
FIG. 3A is an enlarged fragmentary side view of a coated glass substrate of one embodiment of the present invention illustrating the coated glass substrate before the solvent layer is evaporated.
Figure 3B:
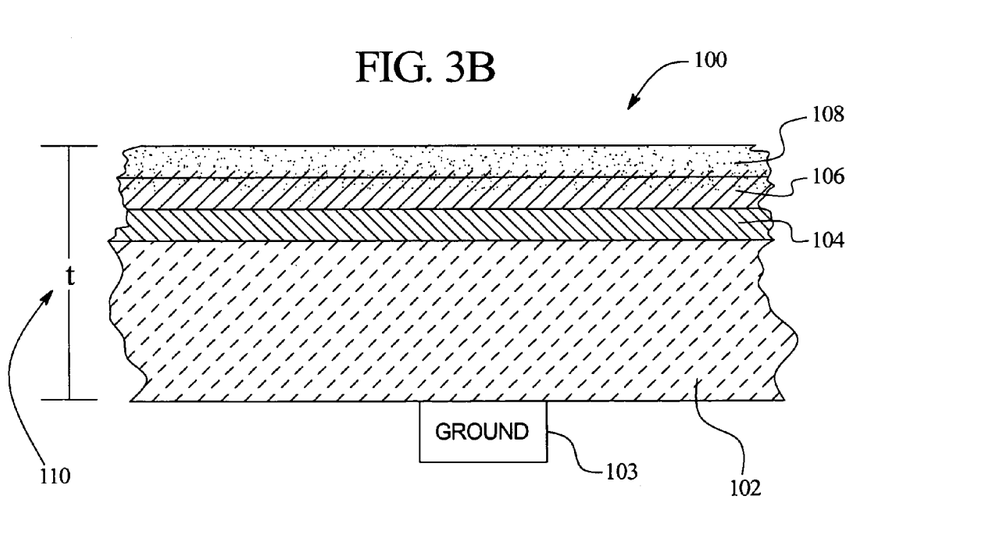
FIG. 3B is an enlarged fragmentary cross-sectional view of the coated glass substrate of FIG. 3A.

Referring now to FIGS. 2, 3A and 3B, in one presently preferred embodiment of the method of the present invention, the glass substrate is positioned on an electrically grounded support or holder as indicated by block 200. In one embodiment, the grounded support is made of an electrically conductive material such as metal and contacts and supports the glass substrate. In another embodiment, the grounded support includes a grounding plate or surface which supports and contacts a surface of the glass substrate. It should be appreciated that any suitable grounding support may be used to support and ground the glass substrate.

Before any coatings are applied to the glass substrate, one or more surfaces of the glass substrate 102 such as the outer surface of a glass beaker, are cleaned using a suitable cleaner to remove all or a substantial portion of the impurities from the surface of the glass substrate as indicated in block 201. In the presently preferred embodiment, the cleaner is a solvent such as methyl ethyl ketone ("MEK"). The cleaning of the surface of the glass substrate may be performed manually or mechanically such as by a machine. It should be appreciated that other suitable cleaning methods and cleaners may be used to clean the surface of the glass substrate. It should also be appreciated that the surface of the glass substrate does not have to be cleaned prior to applying the primer. For example, the glass substrate itself may be clean or substantially free of impurities prior to applying the layers to the glass substrate. The layers are then applied to the substrate in a clean room or a room virtually free from impurities. It should be appreciated that the glass substrate could also be manufactured in a clean room. It should further be appreciated that the glass substrate may be cleaned by a separate cleaning process or in a separate cleaning area prior to positioning the glass substrate on the grounded support.

A layer of primer 104 is applied to the cleaned surface of the glass substrate as indicated by block 202. The primer may be any suitable primer such as the 1200 clear primer manufactured by the Dow Corning Corporation. In a presently preferred embodiment, the primer is a clear primer and is applied or sprayed onto the surface of the glass substrate as a mist or atomized spray. It should be appreciated that the primer may be applied using other suitable coating processes such as dipping the substrate into a container of the primer. In this embodiment, the purpose of applying the primer as a mist is to avoid or reduce the chances of the surface of becoming wet or saturated with the primer. If the surface is wet or saturated with the primer, the appearance of the final coated glass substrate might appear cloudy or obscured due to the pooling of the primer on the surface of the glass substrate. Therefore, the pooling of the primer may also cause the surface to be uneven and inhibit light from passing through or cause refraction of the light through the coated glass substrate. The obscure nature of the glass substrate may also inhibit a user from being able to see through the substrate. Therefore, a fine mist or atomized spray is preferably applied to the substrate in relatively small quantities over the surface of the substrate. The primer adheres to the surface of the glass substrate being coated and acts as a bonding agent for subsequent coating layers. Once the primer is applied to the surface of the glass substrate, the primer is cured using a suitable curing process as indicated by block 204. In one embodiment, the primer is cured in an oven or other suitable heater. In another embodiment, the primer is air-dried to cure the primer. It should be appreciated that any suitable curing process or method may be used to cure the primer in accordance with the present invention. In the presently preferred embodiment, the primer is cured by heating the primer with an oven or kiln to a temperature of approximately 500° F. (260° C.) for approximately five minutes.

After the primer has properly cured, an electro-conductive enhancer is applied to the primer as indicated by block 206. In the presently preferred embodiment, the enhancer is a highly polarized solvent which is electrically conductive. When the solvent is applied to the primer the glass substrate becomes grounded. As a result, the solvent and the glass substrate develop a charge which attract materials or particles having an opposite charge. In one embodiment, the solvent is a water soluble solvent. In another embodiment, the solvent is N-methyl-2-pyrrolidone (NMP), which is water soluble. In the presently preferred embodiment, the NMP solvent is applied as a fog spray onto the primer layer 104 of the surface of the glass substrate 102. This process continues until the surface of the glass substrate is wet or completely coated with the NMP. It should be appreciated that in one embodiment, for example wherein PE is applied to the surface of the glass substrate, rather than utilizing a separate primer as described above, the NMP solvent functions as both a primer and as a wetting agent or electro-conductive enhancer.

While the layer of NMP is still wet, a layer of PFA, MFA or PE is applied to the wet NMP layer. In the presently preferred embodiment, the PFA, MFA or PE is applied as particles which have an opposite charge from the NMP layer. As described above, the glass substrate is grounded, which promotes the flow of electric charge from the PFA, MFA or PE layer to the solvent layer. The voltage differential causes the NMP layer to attract the oppositely charged PFA or MFA particles to the NMP as indicated by block 208. It should be appreciated that although not shown in FIG. 2, the oppositely charged PE particles are attracted to the NMP layer. This process causes the PFA, MFA or PE layer to uniformly coat the NMP layer without pooling or forming drips. Once the particles coat the solvent or NMP layer, the particles act as an insulator against further particles accumulating on the NMP layer. In a presently preferred embodiment, the PFA, MFA or PE layer 108 is powder sprayed and electrically attracted to the wet NMP layer until the thickness of the coatings on the glass substrate achieves a desired thickness. Specifically, the desired thickness of the coatings is approximately 0.002 to 0.003 inches. Once the PFA, MFA or PE layer 108 is applied, the coated glass substrate includes three coating layers 104, 106 and 108 as illustrated in FIGS. 3A and 3B. It should be appreciated that any suitable thickness may be implemented with the present method based on the desire of the manufacturer. Additionally, the PFA layer 108 may include any suitable PFA coating such as 532-5010 or 5011 PFA manufactured by E.I. Du Pont de Nemours and Company. The MFA layer 108 may include any suitable MFA coating such as MFA 620, MFA 640, MFA 6010, MFA 660, MFA 6012 or MFA 1041 manufactured by Solvay Solexis Inc. The PE coating may include any suitable PE coating such as Glas-Lok GLS® powder manufactured by Innotek Powder Coatings.

After the PFA, MFA or PE layer 108 has been applied to the NMP layer 106 on the surface of the glass substrate, the coated substrate is heated to evaporate the solvent layer and secure or adhere the PFA, MFA or PE layer 108 to the primer 104 on the surface of the glass substrate as indicated by block 210. It should be appreciated that any suitable evaporation method may be employed to evaporate the solvent. It should also be noted that the solvent evaporates at a temperature of 400° F. (204° C.) and the PFA or MFA particles or layer begins to melt and cure at 500° F. (260° C.) and the PE particles or layer begins to melt or cure at 203° F. (95° C.). In a presently preferred embodiment, the PFA or MFA layer is heated at a temperature of approximately 800° F. (427° C.) for approximately twenty minutes and the PE layer is heated at a temperature of approximately 400° F. (204° C.) for approximately five to ten minutes. Because the solvent evaporates at 400° F., the solvent evaporates first as the coated substrate is heated. Once the solvent evaporates from the surface of the coated glass substrate, the PFA, MFA or PE remains and begins to melt and cure on the surface of the glass substrate.

The PFA, MFA or PE layer is tightly packed due to application of the PFA, MFA or PE to the wet layer of solvent. As a result, the PFA, MFA or PE layer adheres directly to the primer on the surface of the glass substrate when the solvent (NMP) evaporates from the surface of the glass substrate. This enables the final PFA, MFA or PE coated glass substrate to have a much clearer appearance. Therefore, a user can see through the coated glass substrate and light is able to pass through the coated glass substrate. These transparent and translucent characteristics of the coated glass substrate of the present invention enable the coated glass substrate and method of the present invention to be used for several commercial and industrial applications such as light bulbs, home glassware, laboratory glassware, windows and windshields. Once the curing process is complete, the coated glass substrate is transferred to another manufacturing area for further processing. It should be appreciated that as fluorescent tubes/bulbs function at lower temperatures than incandescent tubes/bulbs, the use of PE provides an economically attractive alternative to the costs associated with the high temperature capabilities of PFA or MFA.

In one embodiment, one or more pigmented primers may be implemented in accordance with the present invention. These pigmented primers may be opaque or translucent. In another embodiment, the coatings of PFA, MFA or PE are pigmented to provide different colored hues to the coated glass substrate. For example, the coatings may be pigmented to a pink, green or blue hue to enhance the appearance of food displayed in deli display cases which include the coated glass substrate.

The method of the present invention creates very strong bonds between the PFA, MFA or PE and the primer on the surface of the glass substrate 102. As a result, the PFA, MFA or PE layer conforms to the glass and stretches to hold the glass surface together even when the glass shatters into several pieces. This prevents the glass from breaking up and falling away from the glass surface. Therefore, the coated glass substrates and products produced according to the present invention are very durable and resistant breaking apart, which makes the coated glass substrate of the present invention suitable for several different applications. For example, the PFA, MFA or PE coated glass substrate may be used for laboratory glassware such as a test tube or beaker. The strength of the bonds created between the PFA, MFA or PE layer 108 and the surface of the glass substrate 102 enables the glass surface of the laboratory glassware to substantially maintain its structural integrity upon shattering or breaking. This is very important for safety purposes because injuries or potentially serious injuries can be minimized or prevented. Also, the strength of the PFA or MFA bonds enables the coated glass to withstand high pressure and temperature cleaning systems found in laboratories and hospitals. It should be appreciated that any suitable fluoropolymer, such as other polytetrafluoroethylene copolymers, or non-fluoropolymer, such as vinyl powders, may be implemented in accordance with the present invention. For example, vinyl powder sold by Duravin under the name Seb-Evh Clear may be electrostically sprayed over the primed glass surface while it is still wet and then cured at 390° F. (199° C.) to 400° F. (204° C.) for five to ten minutes, depending on the mass of the glass substrate. In this example, the primer is a dispersion of the vinyl powder dissolved in NMP, wherein the dispersion includes twenty-five percent vinyl powder.

In another embodiment of the present invention, the surface of the substrate to be coated is first grit blasted to roughen it and promote the adherence of subsequent layers of the PFA, MFA or PE coating. For example, the bottom surfaces of the substrate are concave and need to be grit blasted to prevent delamination while a Bunsen burner is used to heat the bottom of the substrate. In this example, a black colored primer is used to even out the heat provided by the Bunsen burner and also to provide an enhanced bond with the PFA, MFA or PE. In another embodiment, sand of aluminum oxide is added to the black primer to create a rough surface that remains rough after the application of the PFA, MFA or PE topcoat. In this embodiment, the rough surface prevents the sliding of objects on the surface of the substrate It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A method of manufacturing a coated glass substrate, said method comprising the steps of:
   (a) applying a layer of primer to a surface of a glass substrate;
   (b) applying a layer of electro-conductive enhancer to the primer;
   (c) applying a layer of tetrafluoroethylene perfluoromethylvinylether copolymer to the electro-conductive enhancer; and
   (d) securing the tetrafluoroethylene perfluoromethylvinylether copolymer to the glass substrate by removing the electro-conductive enhancer layer through evaporation.

2. The method of claim 1, which includes the step of cleaning the surface of the glass substrate prior to step (a).

3. The method of claim 2, wherein the step of cleaning the surface of the glass substrate includes applying methyl ethyl ketone to the surface of the glass substrate.

4. The method of claim 1, wherein the step of applying the layer of primer to the surface of the glass substrate includes applying a transparent layer of primer to the surface of the glass substrate.

5. The method of claim 1, wherein the step of applying the layer of primer to the surface of the glass substrate includes applying a layer of translucent primer to the surface of the glass substrate.

6. The method of claim 1, which includes the step of curing the primer after step (a).

7. The method of claim 6, wherein the step of curing the primer includes heating the primer to a temperature of approximately 500° Fahrenheit for approximately five minutes.

8. The method of claim 1, wherein the step of applying the layer of primer to the surface of the glass substrate includes spraying a mist of the primer on the surface of the glass substrate.

9. The method of claim 1, wherein the step of applying the layer of the electro-conductive enhancer to the primer includes applying a layer of a solvent to the primer.

10. The method of claim 1, wherein the step of applying the layer of electro-conductive enhancer to the primer includes applying a layer of a water soluble solvent to the primer.

11. The method of claim 1, wherein the step of applying the layer of electro-conductive enhancer to the primer includes applying a layer of N-methyl-2 pyrrolidone to the primer.

12. The method of claim 1, wherein the step of applying the layer of tetrafluoroethylene perfluoromethylvinylether copolymer to the electro-conductive enhancer includes applying a layer of powdered tetrafluoroethylene perfluoromethylvinylether copolymer to the electro-conductive enhancer.

13. The method of claim 1, wherein the step of securing the tetrafluoroethylene perfluoromethylvinylether copolymer includes heating the electro-conductive enhancer and tetrafluoroethylene perfluoromethylvinylether copolymer.

14. The method of claim 13, wherein the step of heating the electro-conductive enhancer and tetrafluoroethylene perfluoromethylvinylether copolymer includes heating the electro-conductive enhancer and tetrafluoroethylene perfluoromethylvinylether copolymer to a temperature of approximately 800° Fahrenheit for approximately twenty minutes.

15. The method of claim 1, wherein the tetrafluoroethylene perfluoromethylvinylether copolymer is applied until a desired thickness is achieved.

16. The method of claim 15, wherein the desired thickness is in a predetermined range of thicknesses.

17. The method of claim 16, wherein the range of thicknesses is approximately 0.002 to 0.003 inches.

18. The method of claim 1, which includes the step of placing the glass substrate on an electrically grounded support prior to step (c).

19. The method of claim 1, wherein the step of applying the tetrafluoroethylene perfluoromethylvinylether copolymer to the electro-conductive enhancer includes electrically attracting the tetrafluoroethylene perfluoromethylvinylether copolymer to the electro-conductive enhancer.

20. A method of manufacturing a coated glass substrate, said method comprising the steps of:
(a) placing a glass substrate on an electrically grounded support;
(b) applying a layer of primer to a surface of the glass substrate;
(c) applying a layer of electro-conductive enhancer to the primer causing the electro-conductive enhancer to become electrically grounded;
(d) electrically attracting a layer of tetrafluoroethylene perfluoromethylvinylether copolymer to the electro-conductive enhancer; and
(e) securing the tetrafluoroethylene perfluoromethylvinylether copolymer to the glass substrate by removing the electro-conductive enhancer through evaporation.

21. The method of claim 20, which includes the step of cleaning the surface of the glass substrate prior to step (a).

22. The method of claim 21, wherein the step of cleaning the surface of the glass substrate includes applying methyl ethyl ketone to the surface of the glass substrate.

23. The method of claim 20, which includes the step of cleaning the surface of the glass substrate after step (a).

24. The method of claim 20, which includes the step of curing the primer prior to step (c).

25. The method of claim 24, wherein the step of curing the primer includes heating the primer to a temperature of approximately 500° Fahrenheit for approximately five minutes.

26. The method of claim 20, wherein the step of applying the layer of electro-conductive enhancer to the primer includes applying a layer of solvent to the primer.

27. The method of claim 20, wherein the step of applying the layer of electro-conductive enhancer to the primer includes applying a layer of a water soluble solvent to the primer.

28. The method of claim 20, wherein the step of applying the layer of electro-conductive enhancer to the primer includes applying a layer of N-methyl-2 pyrrolidone to the primer.

29. The method of claim 20, wherein the step of electrically attracting the layer of tetrafluoroethylene perfluoromethylvinylether copolymer to the electro-conductive enhancer includes electrically attracting powdered tetrafluoroethylene perfluoromethylvinylether copolymer to the electrically conductive enhancer.

30. The method of claim 20, wherein the securing step includes heating the electro-conductive enhancer and tetrafluoroethylene perfluoromethylvinylether copolymer.

31. The method of claim 30, wherein the step of heating the electro-conductive enhancer coating and tetrafluoroethylene perfluoromethylvinylether includes heating the electrically conductive enhancer and tetrafluoroethylene perfluoromethylvinylether copolymer to approximately 800° Fahrenheit for approximately twenty minutes.

32. A method of manufacturing a coated glass substrate, said method comprising the steps of:
(a) cleaning a surface of the glass substrate and placing a glass substrate on an electrically grounded support;
(b) applying a primer layer to the cleaned surface of the glass substrate;
(c) applying an electro-conductive enhancer layer to the primer layer and causing the electro-conductive enhancer layer to become electrically grounded; and
(d) electrically attracting a tetrafluoroethylene perfluoromethylvinylether copolymer layer to the electro-conductive enhancer layer; and
(e) securing the tetrafluoroethylene perfluoromethylvinylether copolymer layer to the glass substrate by removing the electro-conductive enhancer layer through evaporation.

33. The method of claim 32, wherein the step of cleaning the surface of the glass substrate includes applying methyl ethyl ketone to the surface of the glass substrate.

34. The method of claim 32, which includes the step of curing the primer layer after step (b).

35. The method of claim 34, wherein the step of curing the primer layer includes heating the primer layer to a temperature of approximately 500° Fahrenheit for approximately five minutes.

36. The method of claim 32, wherein the step of applying the electro-conductive enhancer layer to the primer layer includes applying a solvent layer to the primer layer.

37. The method of claim 32, wherein the step of applying the electro-conductive enhancer layer to the primer layer includes applying a water soluble solvent layer to the primer layer.

38. The method of claim 32, wherein the step of applying the electro-conductive enhancer layer to the primer layer includes applying a N-methyl-2 pyrrolidone layer to the primer layer.

39. The method of claim 32, wherein the step of electrically attracting the tetrafluoroethylene perfluoromethylvinylether copolymer layer to the electro-conductive enhancer layer includes electrically attracting a powdered tetrafluoroethylene perfluoromethylvinylether copolymer to the electro-conductive enhancer layer.

40. The method of claim 32, wherein the securing step includes the step of heating the electro-conductive enhancer layer and tetrafluoroethylene perfluoromethylvinylether copolymer layer.

41. The method of claim 40, wherein the step of heating the electro-conductive enhancer layer and tetrafluoroethylene perfluoromethylvinylether copolymer layer includes heating the enhancer layer and tetrafluoroethylene perfluoromethylvinylether copolymer layer to a temperature of approximately 800° Fahrenheit for approximately twenty minutes.

42. A method of coating a glass substrate with a tetrafluoroethylene perfluoromethylvinylether copolymer, said method comprising:
(a) applying the tetrafluoroethylene perfluoromethylvinylether copolymer to the glass substrate using an electro-conductive enhancer; and
(b) securing the tetrafluoroethylene perfluoromethylvinylether copolymer to the glass substrate by removing the electro-conductive enhancer through evaporation.

43. The method of claim 42, which includes the step of coating the glass substrate with a solvent prior to step (a).

44. The method of claim 42, which includes the step of coating the glass substrate with a water-soluble solvent prior to step (a).

45. The method of claim 44, wherein the step of coating the glass substrate with the water-soluble solvent includes coating the glass substrate with N-methyl-2 pyrrolidone.

46. The method of claim 42, wherein the evaporation of the electro-conductive enhancer includes heating the electro-conductive enhancer to a temperature of approximately 800° Fahrenheit for approximately twenty minutes.

47. A method of applying tetrafluoroethylene perfluoromethylvinylether copolymer to glass, said method comprising:
(a) coating a glass substrate with an electro-conductive enhancer layer;
(b) coating the electro-conductive enhancer layer with a tetrafluoroethylene perfluoromethylvinylether copolymer layer;
(c) enabling the electro-conductive enhancer layer and the tetrafluoroethylene perfluoromethylvinylether copolymer layer to intermix; and
(d) securing the tetrafluoroethylene perfluoromethylvinylether copolymer layer to the surface of the glass substrate by removing the electro-conductive enhancer layer through evaporation.

48. The method of claim 47, wherein the step of coating the glass substrate with the electrically conductive enhancer layer includes coating the glass substrate with a solvent.

49. The method of claim 47, wherein the step of coating the glass substrate with the electro-conductive enhancer layer includes coating the glass substrate with a water-soluble solvent.

50. The method of claim 47, wherein the step of coating the glass substrate with the electro-conductive enhancer layer includes coating the glass substrate with N-methyl-2 pyrrolidone.

51. The method of claim 47, wherein the evaporation of the electro-conductive enhancer layer includes heating the intermixed tetrafluoroethylene perfluoromethylvinylether copolymer and electro-conductive enhancer layers to a temperature of approximately 800° Fahrenheit for approximately twenty minutes.

52. A method of applying a tetrafluoroethylene perfluoromethylvinylether copolymer to a glass substrate, said method comprising:
(a) placing the glass substrate on an electrically grounded support;
(b) coating a surface of the glass substrate with a primer;
(c) coating the primer with an electro-conductive enhancer;
(d) electrically attracting a tetrafluoroethylene perfluoromethylvinylether copolymer to the enhancer; and
(e) adhering the tetrafluoroethylene perfluoromethylvinylether copolymer to the primer on the surface of the glass substrate by removing the electro-conductive enhancer through evaporation.

53. The method of claim 52, which includes the step of curing the primer prior to step (c).

54. The method of claim 52, wherein the step of curing the primer includes heating the primer to a temperature of approximately 500° Fahrenheit for approximately five minutes.

55. The method of claim 52, wherein the step of electrically attracting tetrafluoroethylene perfluoromethylvinylether copolymer to the electro-conductive enhancer includes electrically attracting powdered tetrafluoroethylene perfluoromethylvinylether copolymer to the electro-conductive enhancer.

56. The method of claim 52, which includes the step of enabling the electro-conductive enhancer and the tetrafluoroethylene perfluoromethylvinylether copolymer to intermix prior to step (e).

57. The method of claim 52, wherein the evaporation of the electro-conductive enhancer includes heating the tetrafluoroethylene perfluoromethylvinylether copolymer and the electro-conductive enhancer to a temperature of approximately 800° Fahrenheit for approximately twenty minutes.

58. The method of claim 52, wherein the step of electrically attracting the tetrafluoroethylene perfluoromethylvinylether copolymer to the electro-conductive enhancer includes electrically attracting the tetrafluoroethylene perfluoromethylvinylether copolymer to the electro-conductive enhancer until the coating on the glass substrate achieves a predetermined thickness.

59. The method of claim 52, wherein the step of electrically attracting the tetrafluoroethylene perfluoromethylvinylether copolymer to the electro-conductive enhancer includes electrically attracting the tetrafluoroethylene perfluoromethylvinylether copolymer to the electro-conductive enhancer until the coating on the glass substrate achieves a thickness of approximately 0.002 to 0.003 inches.

60. A method of applying a tetrafluoroethylene perfluoromethylvinylether copolymer to a glass substrate, said method comprising:
(a) placing the glass substrate on an electrically grounded support;
(b) coating a surface of the glass substrate with a primer;
(c) curing the primer;
(d) coating the primer with an electro-conductive enhancer;

(e) electrically attracting the tetrafluoroethylene perfluoromethylvinylether copolymer to the electro-conductive enhancer; and (f) adhering the tetrafluoroethylene perfluoromethylvinylether copolymer to the primer on the surface of the glass substrate by evaporating the enhancer.

61. The method of claim 60, wherein the tetrafluoroethylene perfluoromethylvinylether copolymer is a powder.

62. A method of manufacturing a coated glass substrate, said method comprising the steps of:

(a) applying a layer of primer to a surface of a glass substrate;

(b) applying a layer of electro-conductive enhancer to the primer;

(c) applying a layer of a polyethylene polymer to the electro-conductive enhancer; and (d) securing the polyethylene polymer to the glass substrate by removing the electro-conductive enhancer layer through evaporation.

63. The method of claim 62, which includes the step of cleaning the surface of the glass substrate prior to step (a).

64. The method of claim 63, wherein the step of cleaning the surface of the glass substrate includes applying methyl ethyl ketone to the surface of the glass substrate.

65. The method of claim 62, wherein the step of applying the layer of primer to the surface of the glass substrate includes applying a transparent layer of primer to the surface of the glass substrate.

66. The method of claim 62, wherein the step of applying the layer of primer to the surface of the glass substrate includes applying a layer of translucent primer to the surface of the glass substrate.

67. The method of claim 62, which includes the step of curing the primer after step (a).

68. The method of claim 67, wherein the step of curing the primer includes heating the primer to a temperature of approximately 500° Fahrenheit for approximately five minutes.

69. The method of claim 62, wherein the step of applying the layer of primer to the surface of the glass substrate includes spraying a mist of the primer on the surface of the glass substrate.

70. The method of claim 62, wherein the step of applying the layer of the electro-conductive enhancer to the primer includes applying a layer of a solvent to the primer.

71. The method of claim 62, wherein the step of applying the layer of electro-conductive enhancer to the primer includes applying a layer of a water soluble solvent to the primer.

72. The method of claim 62, wherein the step of applying the layer of electro-conductive enhancer to the primer includes applying a layer of N-methyl-2 pyrrolidone to the primer.

73. The method of claim 62, wherein the step of applying the layer of polyethylene polymer to the electro-conductive enhancer includes applying a layer of powdered polyethylene polymer to the electro-conductive enhancer.

74. The method of claim 62, wherein the step of securing the polyethylene polymer includes heating the electro-conductive enhancer and polyethylene polymer.

75. The method of claim 74, wherein the step of heating the electro-conductive enhancer and polyethylene polymer includes heating the electro-conductive enhancer and polyethylene polymer to a temperature of approximately 800° Fahrenheit for approximately twenty minutes.

76. The method of claim 62, wherein the polyethylene polymer is applied until a desired thickness is achieved.

77. The method of claim 76, wherein the desired thickness is in a predetermined range of thicknesses.

78. The method of claim 77, wherein the range of thicknesses is approximately 0.002 to 0.003 inches.

79. The method of claim 62, which includes the step of placing the glass substrate on an electrically grounded support prior to step (c).

80. The method of claim 62, wherein the step of applying the polyethylene polymer to the electro-conductive enhancer includes electrically attracting the polyethylene polymer to the electro-conductive enhancer.

81. The method of claim 62, wherein the polyethylene polymer is a powder.

* * * * *